Nov. 29, 1932.  A. CAMPBELL  1,889,169
DUMP CAR CONSTRUCTION
Filed Nov. 27, 1929   5 Sheets-Sheet 2

Nov. 29, 1932.  A. CAMPBELL  1,889,169
DUMP CAR CONSTRUCTION
Filed Nov. 27, 1929   5 Sheets-Sheet 3

Witness:
William P. Kilroy

Inventor,
ARGYLE CAMPBELL
By George I. Haight
Att'y

Nov. 29, 1932.                A. CAMPBELL                1,889,169
                           DUMP CAR CONSTRUCTION
                       Filed Nov. 27, 1929       5 Sheets-Sheet 4
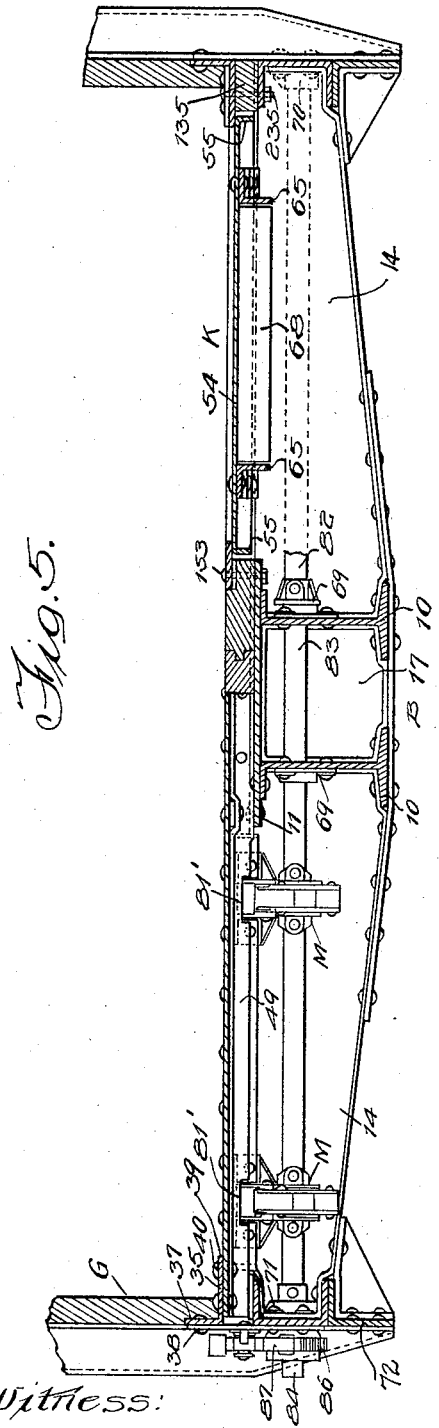
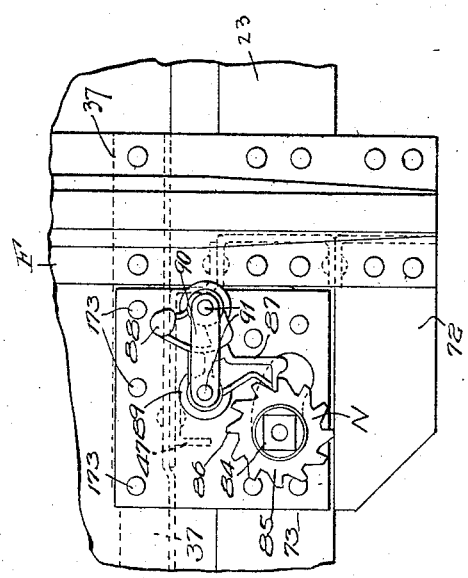
Inventor:
ARGYLE CAMPBELL Nov. 29, 1932.  A. CAMPBELL  1,889,169
DUMP CAR CONSTRUCTION
Filed Nov. 27, 1929   5 Sheets-Sheet 5
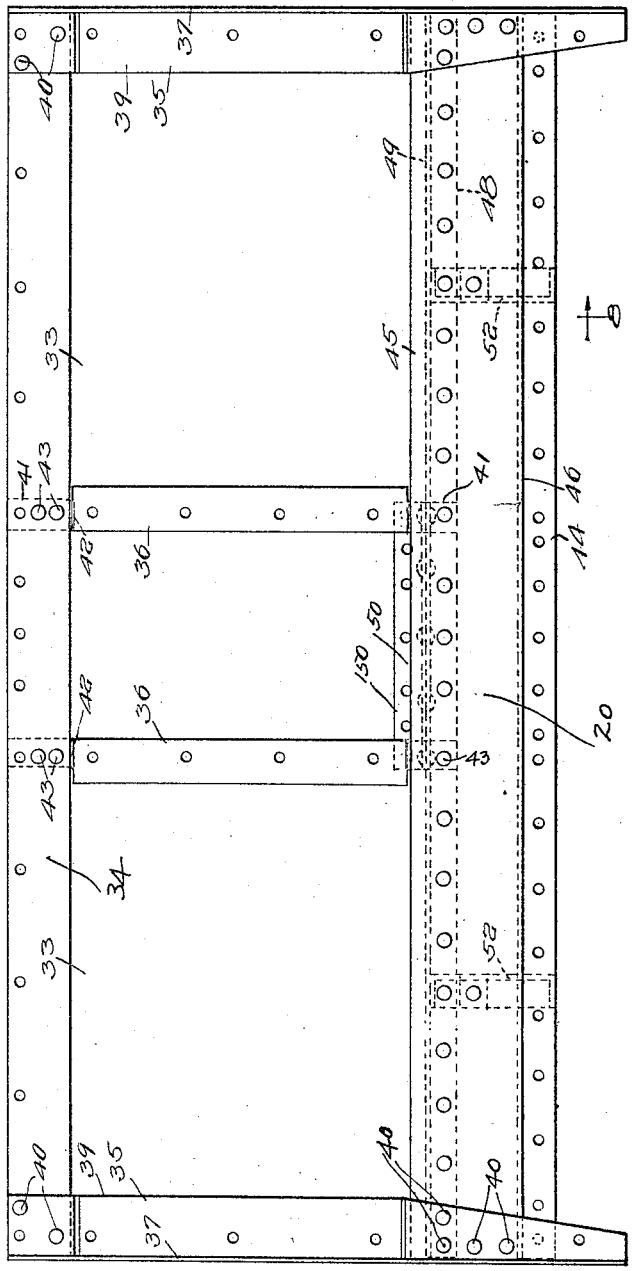
Witness:
William P. Kilroy
Inventor:
ARGYLE CAMPBELL
By George I. Haight
Atty Patented Nov. 29, 1932

1,889,169

UNITED STATES PATENT OFFICE

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS

DUMP CAR CONSTRUCTION

Application filed November 27, 1929. Serial No. 410,039.

My invention relates to dump car construction.

An object of my invention is to provide an improved construction for dump cars of the level floor type and especially that class of car having a wooden floor of appreciable thickness whereby discharge doors may be inset in the wood floor, and a substantially level floor obtained with tightly fitting doors when the doors are in closed position.

Another object of my invention is to embody in a car of the substantially level floor type self contained door framing adapted to provide edge floor plates around the edges of the doors and further provide a rigid framework adapted to brace the car framing and car sides adjacent the door openings.

Still another object of my invention is to provide an improved floor construction in a car having a floor of appreciable thickness whereby discharge doors may be inset in the wooden flooring and clearances provided in the plane of the floor for the door operating mechanism.

Still another further object of my invention is to improve the construction of dump cars of the type having transversely hinged doors adapted to be operated by means of door operating shafts extending through the longitudinal load carrying members of the car, whereby the shafts will extend through the load carrying members adjacent the horizontal neutral axes of the same and thus avoid weakening or cutting out vital parts of the load carrying members of the car.

My invention further resides in the arrangement of doors relative to adjacent fixed floor sections whereby large dumping capacity is attained with comparatively small dumping area.

Other objects of the invention will more clearly appear in the description and claims hereinafter inserted.

For further comprehension of my invention, reference may be had to the accompanying drawings wherein:

Fig. 1 indicates a longitudinal elevational sectional view of a composite car structure embodying my invention, said view being taken to one side of the center of the car and showing approximately half the length of the car;

Fig. 3 is a vertical longitudinal sectional view taken substantially on the line 3—3 of Fig. 2;

Fig. 4 is a fragmentary vertical longitudinal sectional view showing the construction of the car adjacent the center sill, said view being taken substantially on the line 4—4 of Fig. 2 and illustrating the door mechanism in partially released position;

Fig. 5 is a vertical transverse sectional view taken through the car substantially on the line 5—5 of Fig. 2;

Fig. 6 is a side elevational view of a portion of the car illustrating the shaft operating and locking means at the side of the car;

Fig. 7 is a plan view showing the self-contained door framework in assembled relation and detached from the car;

Fig. 8 is a transverse sectional view taken through the framework and on a line corresponding substantially to a line 8—8 of Fig. 7.

Figure 1:
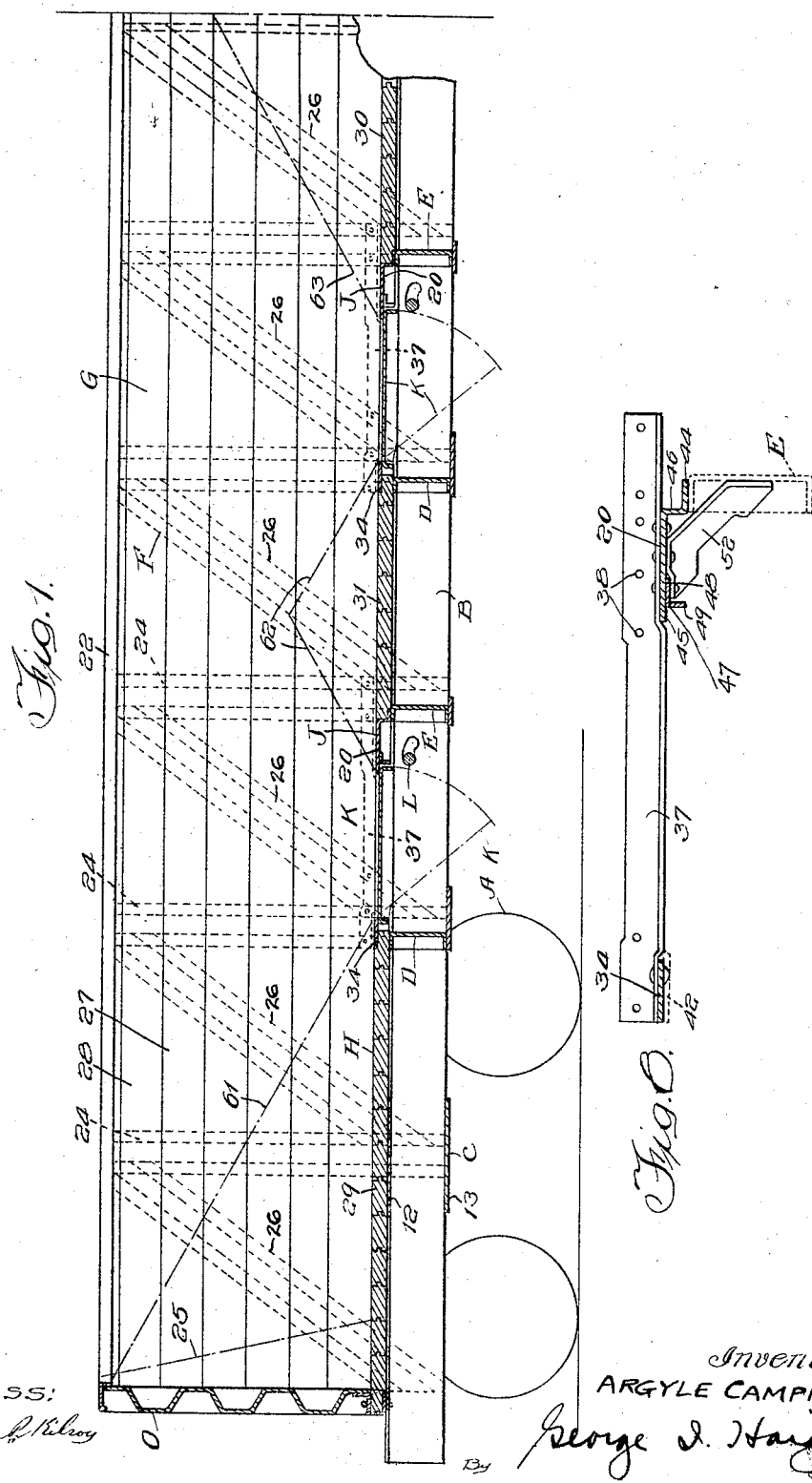

In said drawings, my improved construction is shown as applied to a composite car generally designated as a "mill type" car. This type of car, which is preferably provided with a wooden floor of appreciable thickness, is especially adapted for hauling products of steel mills such as structural steel, rails, pipe and other similar long and heavy materials. Cars for this service are therefore usually provided with movable end walls and are characterized by the absence of interior gussets or other forms of interior bracing such as would extend into the car loading space. The absence of interior bracing is compensated for by the employment of a generous number of side stakes and crossbeams which, while providing the necessary strength, also reduces the distances between crossbeams, and this, combined with the wooden floor, presents difficulties in securing adequate dumping facilities while maintaining level floor, tight-door joints and retaining the strength qualities of the car.

In said drawings, A indicates the trucks of the car; B the center sill structure; C the body bolsters; D and E transverse crossbeams; F metallic side truss frame construction; G wooden side walls; H wooden floor; J dump door frames; K—K dump doors disposed on opposite sides of the center sill and between adjacent crossbeams D and E; L door operating shafts; M door winding mechanisms; N shaft rotating and locking means; and O car end wall.

The center sill structure B consists of two longitudinally extending flanged beam members 10—10 arranged in spaced relation and united by a top cover plate 11, said plate having overhanging portions extending appreciably beyond the upper flanges of the center sill beam members. Only one of the body bolsters C is shown (Fig. 1), and is indicated conventionally by top and bottom cover plates, 12 and 13 respectively.

The transverse crossbeam members D and E (Figs. 1, 3 and 4) are of somewhat similar construction, differing only in the arrangement of cover plates, said members being each composed of two diaphragms 14—14 each formed of pan shape and presenting vertical web 15 and flanges 16. Disposed in substantially the same line as diaphragms 14 and between the center sills are fillers 17. Crossbeams D are each provided with top and bottom cover plates as indicated at 18 and 19, respectively, the former extending from side to side of the car and formed of extended width and disposed to one side of the diaphragm for the purpose to be hereinafter pointed out. Crossbeams E are also provided with top and bottom cover plates as indicated at 20 and 21 respectively, the former being of special shape for the purpose to be hereinafter pointed out.

The side frame construction F (Fig 1) is of the truss type including top chord 22 and bottom chord 23, the latter being of channel shape with the flanges turned inwards and interengaging with the crossbeam diaphragms and constituting a side sill. The side truss construction is divided into twelve panels by means of vertical intermediate side stakes 24 and corner stakes 25, the side stakes being extended upwardly from points adjacent the crossmembers of the car and thus serving in connection with stakes 25 to divide the underframe and sides in twelve panel sections. The panels of the sides are braced by diagonal braces 26. The side wall G includes wooden boards 27 and metallic plates 28, all bolted or riveted to the side framing just described.

The wooden floor H is of appreciable thickness and rests on the center sill, crossbeams, body bolsters and side channels, the top or upper surfaces of these members being substantially in the same plane. Said wooden floor H consists of fixed floor sections as indicated at 29, 30, 31 and 32, and intermediate said floor sections are dumping openings 33 (Fig. 1).

The fixed floor sections 29 are disposed at each end of the car over the trucks and each said section takes in two panels lengthwise of the car, terminating substantially in alignment with the crossbeam nearest the body bolster. Fixed floor section 30, which likewise takes in two panels, is disposed at the central portion of the car. In the three panels intermediate the fixed floor sections 29 and 30 at each end of car are the dump door frames J (Figs. 1 and 7) and the fixed floor section 31, the latter being disposed in the panel between the respective door frames J.

The fixed floor sections 32 extend over the center sill and are disposed in the framework J to complete the floor intermediate the door openings 33, said dumping openings lying on opposite sides of the center sill and disposed substantially in transverse alignment. The various wooden floor sections 29, 30, 31 and 32 are arranged to have their edges terminate substantially in line with the metallic supporting members beneath the same, thus supporting said edge portions and preventing breakage thereof.

Extending from side to side of the car and between the pair of crossbeams D and E in each panel having dumping doors are the door frames J, said frames in cooperation with the dumping doors K being adapted to complete the flooring of the car intermediate the fixed floor sections. As the frames J are all of the same general construction, the description hereinafter following will be confined to one frame. Each frame J includes transversely extending floor plate members 20 and 34, respectively disposed adjacent the front and rear edges of the doors, the former also constituting the top cover plate of crossbeam E, said members preferably extending from side to side of the car. The transverse members are connected lengthwise of the car by angle shaped members 35 (Fig. 7) disposed adjacent each side wall of the car, and by longitudinal plates 36 disposed adjacent each side of the center sill structure. Each said angle shaped member 35 includes a vertical wall 37 (Fig. 5) secured to the vertical side stakes and diagonal members of the car side framing by rivets, as indicated at 38. The adjacent wall 39 of the angle member extends horizontally into overlapping relation with the transverse members and is united thereto by rivets 40. Each of said members 35 adjacent one of the stakes extends lengthwise of the car beyond the transverse members of the framing, in order to effect a secure connection with the side framing and floor structure.

The plates 36 are formed at each end with a portion of reduced width 41 disposed at one side of the door opening and said portion 41 is crimped at 42 and extended beneath the adjacent transverse member and united therewith by rivets or bolts 43. Said transverse member 20 is of Z shape to present horizontal wall sections disposed in different planes, as indicated at 44 and 45, respectively, and united by a vertical web section 46. The section 44 is secured to the top of the crossbeam diaphragms and center sill and section 45 extends at an appreciable distance above the top of the center sill and crossbeams to form a continuation of the upper floor surface of the wooden floor H, and operates to span the distance intermediate the free edge of the doors and the outer edge of the related fixed floor wooden section. Said floor plate section 45 is rigidified adjacent its outer edge by an angle shaped member 47 having one of its flanges 48 secured to the plate and having its adjacent flange 49 vertically disposed. Said member preferably extends clear across the car, and at the center sill an angle member 50 is secured by one of its flanges 51 to said depending flange 49 and to the center sill by its other flange 50. Intermediate the side wall of the car and the center sill, the floor section 45 is further braced on each side of the center sill to the crossbeam by an angle shaped bracket 52 (Figs. 7 and 8). Said frame member J is further secured to the underframe through the medium of members 34 and 36 by means of bolts, as indicated at 53 and 153, respectively, the former extending through the flange of the crossbeam and the latter through the overhanging portion of the center sill top cover plate. The horizontal plate sections 34, 36, 39 and 45 are arranged to have their edges projecting slightly into the plane of the door to thereby provide sealing edge plates extending across the gap between the fixed floor sections and the edges of the doors. Wooden filler blocks 135 are disposed between the top of the side sill and the horizontal flange 39 of the frame member and retained in place by bolts 235 (Fig. 5).

The discharge doors K are mounted on axes extending transversely of the car and are inset in the floor of the car from the under side to present floor surfaces coinciding substantially with the plane of the upper floor surface of the fixed wooden floor sections, said doors being arranged in pairs of two doors, each door of the pair being disposed on opposite sides of the center sill in transversely aligned relation. As the doors are of similar construction and the mounting thereof identical, the description will be confined to one door only. Each door is preferably of metal, including a body portion 54 which is formed of pan shape with side, front and rear flanges, as indicated at 55, 56 and 57, respectively, the rear edge of the door being curved as at 58 (Fig. 3) on a radius substantially concentric with the hinge axis of the door and tangentially related with respect to the rear edge plate 34 of the framing whereby the curved surface of the door will be in a definite relation to said edge plate in all positions to which the door is swung. The door is pivotally mounted on hinge brackets 59, which in turn are secured to the web 15 of the associated crossbeam diaphragm 14, each said bracket being formed with upwardly extending portions disposed above the crossbeam and adapted to receive door hinge pivot 60, the latter being disposed in the plane of the wooden floor, thereby reducing the extent of fixed floor area rearwardly of the door. The placement of the dumping doors relatively to the fixed floor sections is of importance and more especially so in so far as the doors nearest the end of the car are concerned, for the reason that the gravity discharge of the end load must necessarily be led away through only one set of doors, whereas the gravity discharge of the load from the intermediate floor sections is led away by two sets of doors or from each end of said fixed floor sections. This condition is illustrated in Fig. 1 by the dotted sloping lines 61, 62—62, and 63, representing the slope of the lading left in the car with the doors open, assuming the slope to be the usual 30 degree from horizontal of the conventional hopper car. It will therefore be noted that in view of the length of the side slope 61, the placement of the end door opening as far rearward as possible has a marked effect in increasing the percentage of gravity discharge load. To accomplish this end, the crossbeam diaphragms are offset to one side of the vertical stakes, and the crossbeam top cover plates are offset to one side of the diaphragms, thus permitting the placement of the door openings immediately adjacent the diaphragms. This offset construction, combined with the placement of the axes of the doors in the plane of the wooden floor, results in the end doors being located as near the end crossbeam diaphragm as practicable, and consequently as near the end of the car as practicable inasmuch as the end crossbeams are in turn located as near the wheels of the car as safe clearances will permit.

Figure 2:
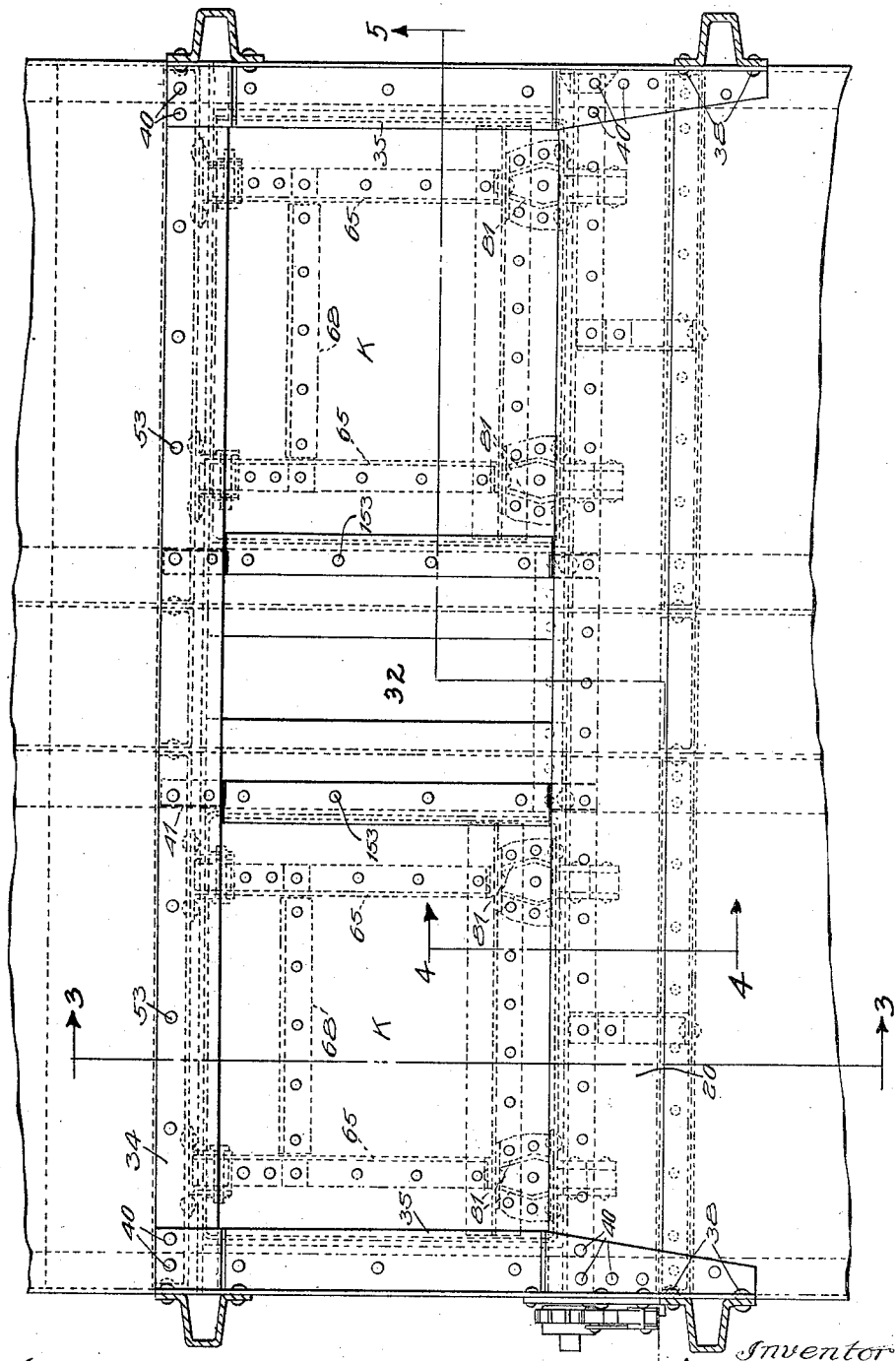
Fig. 2 is a plan view, on an enlarged scale, of a portion of the car showing so much of the car construction as to include a pair of doors with the related car construction incidental thereto.

The door is suitably braced on its under side by two hinge beams 65—65 (Figs. 2 and 3) which connect at one end with hinge straps 66, the latter being adapted to receive pivot 60. At their other ends, said hinge beams connect adjacent the end of the door with a Z shaped marginal member 67, the latter extending along the free edge of the door. Intermediate the hinged end of the door and said member 67, there is an additional reinforcing member 68, preferably of angle shape.

The doors are adapted to be operated in pairs of two transversely aligned doors by means of a door-operating shaft L common to the two doors (Figs. 3, 4 and 5), said shaft extending along the free edge of and below the level of said doors. The shaft extends from side to side of the car through the center sills and one of the side sills, and is mounted in elongated bearings respectively carried by the center sills and side sills. The bearings at the center sill are indicated at 69 and the bearings at the respective side sills are indicated at 70 and 71, respectively, the last named bearing being at the side sill of the car through which the shaft extends. The bearing is therefore provided with angularly related walls respectively secured to the web and lower flange of the side sill to reinforce the cut-away portion. The side sill is further reinforced adjacent the cut-away portion by an angle shaped member 72 (Fig. 5) extending below the side sill and connected thereto and to the bearing of the adjacent stake.

The side sill member is further reinforced at the cut-away portion by an overlying plate 73 (Fig. 6) secured to the outer face of the side sill and extended upwardly and secured to flange 37 of the door framing by rivets 173.

Connecting the shaft and door is the winding means M (Figs. 3, 4 and 6). There are preferably two for each door. Each operating means consists of a series of links 74, 75, 76 and 77, said links being flexibly united by rivets 78 and connected at one end to bracket 79, the latter being carried by the door, and united at the opposite end to a hub casting 80. The hub 80 is rigidly secured to the shaft L and is provided with a series of faces corresponding in number to the number of the links and around which faces the links are adapted to wind. The bracket member 79 on the door is bifurcated to present spaced walls 81—81 adapted to straddle portions of the mechanism when the shaft is in operative locking position. A portion of the door bracket 79 is provided with a forwardly projecting portion extending in the plane of the depending flange 49 of the angle member 47 and the said flange is cut away at 81' to accommodate the said portion and also the winding links during the rotation of the mechanism. The shaft L is so located relatively to the door and the car structure that when the door is in closed position, the longitudinal axis of the shaft extends transversely through the side sill and center sill approximately at the longitudinal neutral axes of said sills, the shaft in the present embodiment lying slightly below the neutral axis of the side sill, as indicated at 82, and slightly above that of the center sill structure, as indicated at 83.

The shaft L moves to the outer end of the bearings when the doors are released and during the winding action of the links certain portions of the winding mechanism extend above the center sill into the recess provided by the upwardly spaced floor section 45.

The shaft operating mechanism N includes a clutch device providing lost motion to prevent injury to the operator, said device being here indicated conventionally by illustrating a squared portion 84 (Fig. 6) adapted to be engaged by an operating tool, said member cooperating with a hollow ratchet member 85 fixedly mounted on the shaft and provided along its periphery with a series of external teeth 86. Cooperable with the teeth 86 to prevent rotation of the shaft in an unwinding direction is the pivoted pawl 87, said pawl being adapted to be locked in position by a dog 88. The pawl and dog are pivotally mounted on lugs formed integrally with base plate 89. Said pawl and dog and base plate, in cooperation with an over-lying tie plate 90, are riveted to the plate 73 by rivets 91, the rivets lying between the top of the side sill and the floor frame K.

I am aware that changes may be made in the construction, combination and arrangement of parts, without departing from the spirit of the invention, and I hereby reserve the right to make such changes as fairly fall within the scope of the appended claims.

I claim:

1. In a car of the character described having center sills, crossmembers outstanding from said center sills, and a floor of appreciable thickness above said center sills and crossmembers, the combination of means forming discharge door openings in transverse alignment on each side of the center sill, said means comprising a self-contained framework including edge floor plates adapted to extend around the door openings, and members extending from door to door across the plane of the center sill.

2. In a car of the character described having side walls, center sills, crossmembers outstanding from said center sills and a floor of appreciable thickness above said center sills and crossmembers, the combination of means forming discharge door openings transversely aligned and on each side of the center sill, said means comprising a self-contained framework including edge floor plates defining the margins of the door openings, and members extending from side to side of the car and secured to the respective side walls.

3. In a car of the character described, the combination with a center sill, crossbeams spaced lengthwise of the car and side wall members; the combination of fixed floor sections of appreciable depth disposed above and carried by certain of said crossbeams, said fixed floor sections terminating adjacent certain of the crossbeams thereby leaving a clear space intermediate a pair of crossbeams, a dumping door hinged adjacent one end of said clear space on an axis extending transversely of the car, said door being disposed with its upper surface substantially in alignment with the upper surface of the fixed floor and having its free edge terminating an appreciable distance away from the other edge of the space, and a door frame disposed in said clear space and spanning the distance intermediate the free edge of the door and the fixed floor edges to provide edge members around the four edges of the doors.

4. In a railway car of the level floor type, the combination of a center sill, crossbeam diaphragm members spaced apart lengthwise of the car, a dumping door in the floor of the car intermediate said crossbeam diaphragms, said door being hinged adjacent one crossbeam diaphragm with its hinge axis extending transversely of the car, cover plates for the crossbeam diaphragm members offset to one side thereof, the cover plate for the crossmember adjacent the hinge of the door being disposed beneath the level of the door, and the crossbeam cover plate adjacent the free edge of the door having a raised portion constituting a floor plate extending above the door and forming an edge sealing plate for the free edge of the door.

5. In a railway car of the character described, the combination of an underframe and crossbeam members extending outwardly therefrom and having flooring of appreciable depth carried by the said underframe member, a side truss frame rising upwardly from the outer ends of the crossbeams, said flooring having a dumping opening extending intermediate the pair of crossbeams and the side walls and center sill of the car, dumping doors disposed in the openings on each side of the center sill, said doors being adapted when in closed position to have their floor surfaces disposed substantially flush with the flooring surfaces, and metallic floor members adjacent the hinged and side edges of the door extending transversely from side to side of the car, said members adjacent the sides of the car being of angle shape having a flange secured directly to said side truss members and having adjacent flanges overlying and secured to the transversely extending floor members.

6. In a car of the character described having center sill and crossbeams extending outwardly therefrom, the combination of a wooden flooring of appreciable thickness disposed above the plane of the said underframe members, a pair of aligned dumping doors disposed on opposite sides of the center sills and hingedly mounted to the crossbeam for swinging movement on axes transversely of the car, each said door when in closed position having its floor surface substantially in alignment with the flooring surface, the free edge of the door when in closed position being spaced an appreciable distance from the wooden flooring, a metallic floor plate forming a floor of reduced thickness spanning the distance between the wooden flooring and the free edge of the door, and door operating mechanism positioned beneath the metallic floor plate.

7. In a car of the character described, the combination of a pair of crossmembers spaced apart lengthwise of the car, a dumping door hingedly mounted adjacent one of said members of the pair, said door when in closed position terminating an appreciable distance from the other crossbeam of the pair, and a crossbeam cover plate bridging the space between the last named crossbeam and the free edge of the door when the door is in closed position.

8. In a dump car, the combination of a center sill, a crossbeam including a diaphragm and a top cover plate, said cover plate being disposed to one side of the diaphragm, a wooden floor of appreciable thickness carried by said crossbeam and terminating adjacent the edge of said cover plate, and a dumping door inset in the wooden floor and mounted on hinge brackets carried by the crossbeam diaphragm, each of said brackets having a portion thereof extended upwardly across the plane of the crossbeam cover plate and having a hinge pivot for the door.

9. In a dump car of the character described, the combination of a center sill, a crossbeam diaphragm, a cover plate carried by said crossbeam, a wooden floor of appreciable thickness carried by the crossbeam, and terminating adjacent the edge of the cover plate, a dumping door inset in the plane of the wooden floor and mounted upon hinge brackets carried by the crossbeam, said brackets having a portion thereof extended upwardly across the plane of the cover plate and having a door supporting pivot, said door being formed with a round edge substantially concentric with the pivotal axis of the door, and an edge floor plate mounted on the floor and extended into the plane of the door, said plate being substantially tangent to the rounded edge of the door whereby said rounded edge of the door will be tangentially related to the edge floor plate in all positions of the door.

10. In a dump car, the combination of a center sill, a crossbeam including a flanged diaphragm and a top cover plate, said cover plate being disposed to one side of the diaphragm, a wooden floor of appreciable thickness carried by said crossbeam and terminating adjacent the edge of the cover plate, an edge floor plate carried by said floor and extending slightly beyond the edge of the floor, means for securing said plate in position including bolts extending through the wooden floor, crossbeam cover plate and diaphragm, a dumping door in said floor having a hinge axis in the plane of the wooden floor adjacent the crossbeam diaphragm, said door having 11. In a car of the character described, the combination of a center sill, a pair of transverse crossbeams spaced apart lengthwise of the car, a flooring of appreciable thickness carried by said crossbeams, a door hinged on an axis extending substantially parallel to and immediately adjacent one of said crossbeams, said door being inset in the floor with its floor surface substantially coincident with the flooring surface of said door being formed with its pivotal axis disposed in the plane of the flooring and having its free edge spaced outwardly from the other crossbeam, a metal floor bridging the space intermediate the free edge of the door and the said crossbeam and disposed at an appreciable distance above the level of the center sill to thereby provide a recess, a door winding and supporting shaft disposed below the level of the door, and winding mechanism connecting the shaft and door, said mechanism during the operation of the door being adapted to have a portion thereof move above the level of the center sill and into said recess.

12. In a car of the character described, the combination of a center sill, crossbeams, side wall stakes extending upwardly adjacent the outer ends of the crossbeams and in cooperation therewith dividing the car lengthwise in twelve panels, fixed floor sections in certain of the panels alternated with pairs of dumping doors in certain other panels, said respective doors of a pair being disposed on opposite sides of the center sill in aligned relation, said fixed floor sections including three main sections each extending over two panels and respectively disposed at the central portion of the car and at each end thereof; and parts of dumping doors in the panels adjacent the end of each said end section and adjacent each end of the central section, said two pairs of doors at each end of the car, being separated lengthwise of the car by fixed floor section in the intervening panel.

13. In a car of the character described having the usual truck parts at each end thereof, said car including an underframe having center sill, side wall stakes and crossbeams spaced lengthwise of the car and secured to the stakes, said crossbeam members including the combination with top cover plates; fixed wooden floor sections of appreciable thickness disposed above the underframe and extending over the truck parts and over certain of the crossmembers, said floor sections being spaced apart to form dumping openings disposed between certain of the fixed floor sections and adapted to direct lading away therefrom; dumping doors for the openings, said doors being hinged on transversely extending axes disposed immediately adjacent the crossbeam to direct lading away from the ends of the car, said crossbeam members and top cover plates being offset to one side of the stakes in a direction towards the end of the car for the purpose of reducing the load retaining area of the fixed floor section above the truck parts and increase the discharging efficiency of the car.

14. In a car of the character described having the usual truck parts adjacent each end thereof, said car including an underframe having center sills and transverse crossbeam members spaced lengthwise of the car, said crossbeam members including top cover plates, and side wall stakes adjacent the ends of the crossbeam members, in combination with fixed floor sections of appreciable thickness disposed above the underframe and extending over the truck parts and above certain of the crossbeam members, said floor sections being spaced apart to form dumping openings disposed between said fixed floor sections; dumping doors for the openings, said doors being hinged on transversely extending axes to direct lading away from the fixed floors, said doors being arranged in pairs in transversely aligned relation, each pair of doors being hinged adjacent a crossbeam member to direct lading away from the ends of the car towards the transverse center thereof, said crossbeams and top cover plates of the respective crossbeams being offset to one side of the stakes in a direction towards the end of the car for the purpose of reducing the load retaining area of the fixed floor section above the trucks and thereby increase the discharging efficiency of the car.

15. In a car of the character described having an underframe including a center sill, crossbeam members, a floor carried by said center sill and crossbeams, and a side wall structure including a portion extending below the floor and having an outstanding flange along the lower margin thereof and a side stake extending below said wall structure, in combination with a dumping door hinged on an axis extending transversely of the car, a door operating shaft extending through the side wall structure below the floor and above the lower flange, and being disposed adjacent the stake, said wall being slotted to admit the shaft, a winding connection between the shaft and door, and a reinforcing flanged member below the flanged side wall structure and secured thereto and to the downwardly extended portion of the stake, said member extending from the stake beyond the slotted portion of the wall member.

16. In a car of the character described including center sills, crossbeams and a side wall structure including a trussed side frame, said side wall truss including a side sill member constituting the lower chord of the truss and having its upper portion at substantially the same level as the center sills and crossbeams, in combination with a wooden floor of appreciable thickness carried by said members and having dumping openings, a metal framework defining the edges of the dumping openings, said framework being spaced from the top of the side sill a distance to clear the wooden floor and having flanged portions connected to the truss frame; dumping doors adapted to close the openings, said doors being hinged on axes extending transversely of the car; a plate secured to the side sill and extended upwardly across the intervening space between the sill and framework and secured to the flanged portions of the latter; a door operating shaft adjacent the free edge of the door and extending through the sill plate, a winding connection between the shaft and door; a ratchet on the shaft; and pawl mechanism cooperable with the ratchet to maintain the shaft against reverse rotation, said pawl mechanism being mounted on the plate intermediate the frame and side sill.

17. As an article of manufacture, a door frame for application to railway cars of the level floor type having center sills, crossbeams, and two transversely aligned door openings on opposite sides of the center sill, said frame including spaced parallel transverse members adapted to extend across the car and defining opposite edges of the two openings, and other members extending lengthwise of the car and disposed adjacent the ends of said transverse members and intermediately thereof secured to the said transverse members, said lengthwise members adjacent the ends of the frame being extended at one end beyond the associated transverse member for attachment to the car structure.

18. As an article of manufacture, a door frame for application to railway cars of the level floor type having center sills, crossbeams and two transversely aligned door openings on opposite sides of the center sill, said frame including spaced parallel members adapted to extend across the car and defining opposite edges of the two aligned door openings, and other members extending lengthwise of the car to complete with said first named members the two door openings of the door frame, one of said transversely extending members having the edge thereof opposite to the door opening and being formed of Z shape for attachment with the car structure.

19. As an article of manufacture, a door frame for application to railway cars of the level floor type having center sills, side walls and two transversely aligned door openings in the floor on opposite sides of the center sill, said frame including spaced parallel members extending across the car and defining opposite edges of the two openings, and other members extending lengthwise of the car and secured to said first named members, said lengthwise members being adapted to lie respectively adjacent the center sills and side walls of the car and having upstanding portions for attachment to the car sides.

20. As an article of manufacture, a frame for application to dumping railway cars of the gondola type having center sills, crossbeams, side walls and two transversely aligned dumping openings on opposite sides of the center sill, said frame including spaced parallel members adapted to extend across the car and defining opposite edges of the two openings and other members extending at substantially right angles to said first named members and secured thereto and adapted in cooperation with the first named members to complete the door frame for the two door openings.

In witness that I claim the foregoing I have hereunto subscribed my name this 22nd day of November 1929.

ARGYLE CAMPBELL.